(12) United States Patent
Lee et al.

(10) Patent No.: US 11,364,775 B2
(45) Date of Patent: Jun. 21, 2022

(54) STRETCHABLE VEHICLE WINDOW SHADE

(71) Applicant: MUNCHKIN, INC., Van Nuys, CA (US)

(72) Inventors: Agnes Yena Lee, Los Angeles, CA (US); Nicholas Arthur Trumbo, Valencia, CA (US); Sung Yun Chan, Pasadena, CA (US); Aidan Rosario, Santa Barbara, CA (US)

(73) Assignee: Munchkin Inc., Van Nuys, CA (US)

( * ) Notice: Subject to any disclaimer, the term of this patent is extended or adjusted under 35 U.S.C. 154(b) by 697 days.

(21) Appl. No.: 16/399,832

(22) Filed: Apr. 30, 2019

(65) Prior Publication Data
US 2019/0337372 A1 Nov. 7, 2019

Related U.S. Application Data

(60) Provisional application No. 62/812,805, filed on Mar. 1, 2019, provisional application No. 62/665,428, filed on May 1, 2018.

(51) Int. Cl.
*B60J 1/20* (2006.01)
*B60J 3/00* (2006.01)
*B60J 3/02* (2006.01)
*B60J 11/08* (2006.01)

(52) U.S. Cl.
CPC ............ *B60J 1/2011* (2013.01); *B60J 1/2091* (2013.01); *B60J 3/007* (2013.01); *B60J 3/02* (2013.01); *B60J 11/08* (2013.01)

(58) Field of Classification Search
CPC ........ B60J 1/2011; B60J 1/2091; B60J 3/007; B60J 3/02; B60J 3/0221; B60J 3/0213; B60J 3/0286

USPC .............. 160/370.21, 351, 350, 404 DIG. 2, 160/DIG. 3, DIG. 4; 296/97.9, 97.7
See application file for complete search history.

(56) References Cited

U.S. PATENT DOCUMENTS

| | | | | |
|---|---|---|---|---|
| 5,064,239 A * | 11/1991 | Folcik | ................... | B60J 1/2091 160/370.21 |
| 2004/0130178 A1* | 7/2004 | Conforti | ................ | B60J 11/08 296/97.9 |
| 2005/0230059 A1* | 10/2005 | Ly | ......................... | B60J 1/2011 160/105 |
| 2008/0191509 A1* | 8/2008 | Monahan | .............. | B60J 1/2091 296/97.5 |
| 2013/0112355 A1* | 5/2013 | Roth | ..................... | A47H 23/00 160/127 |

(Continued)

FOREIGN PATENT DOCUMENTS

| DE | 102017111671 A1 * | 11/2018 |
|---|---|---|
| KR | 200398233 Y1 * | 10/2005 |

(Continued)

OTHER PUBLICATIONS

Ju Bok Won, Machine Translation of KR200468819, Sep. 3, 2013 (Year: 2013).*

*Primary Examiner* — Jason S Morrow
*Assistant Examiner* — Wenwei Zhuo
(74) *Attorney, Agent, or Firm* — Robert Z. Evora, Esq.

(57) ABSTRACT

A stretchable vehicle window shade that may have a panel and a positioning tab attached to the panel. The positioning tab may have a magnet disposed inside. The magnet may be adapted so that a magnetic force allows attachment to a metallic portion of a door frame of a vehicle.

17 Claims, 16 Drawing Sheets

(56) References Cited

U.S. PATENT DOCUMENTS

| | | | |
|---|---|---|---|
| 2019/0183277 A1* | 6/2019 | Dimick | A47H 23/04 |
| 2020/0231029 A1* | 7/2020 | Barrett | H05B 3/84 |

FOREIGN PATENT DOCUMENTS

| | | | |
|---|---|---|---|
| KR | 200460548 Y1 * | 6/2012 | |
| KR | 200468819 Y1 * | 9/2013 | |

* cited by examiner

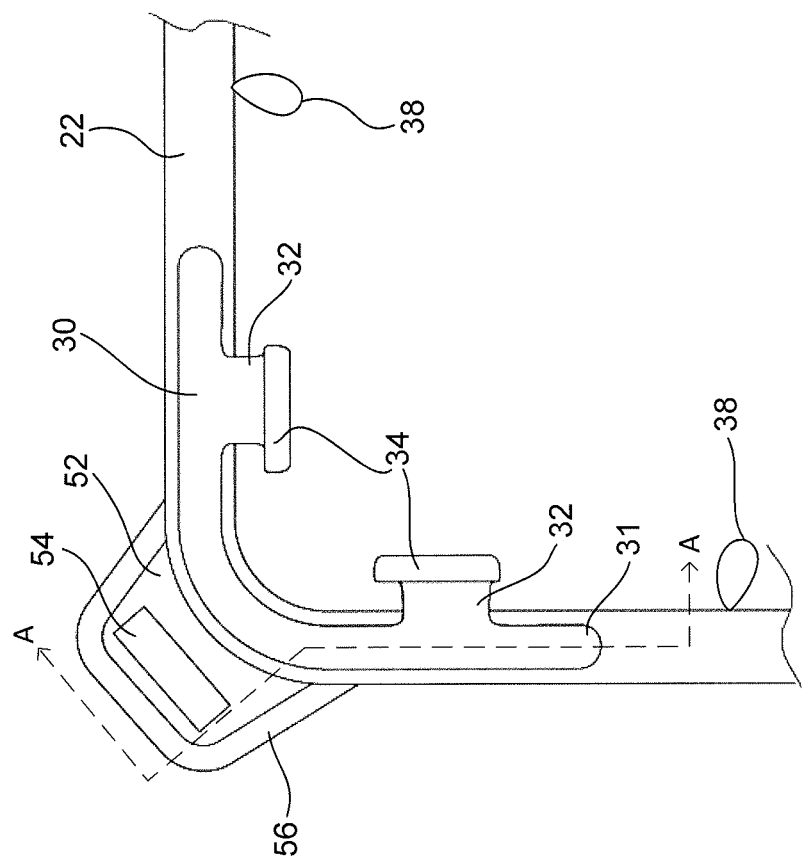
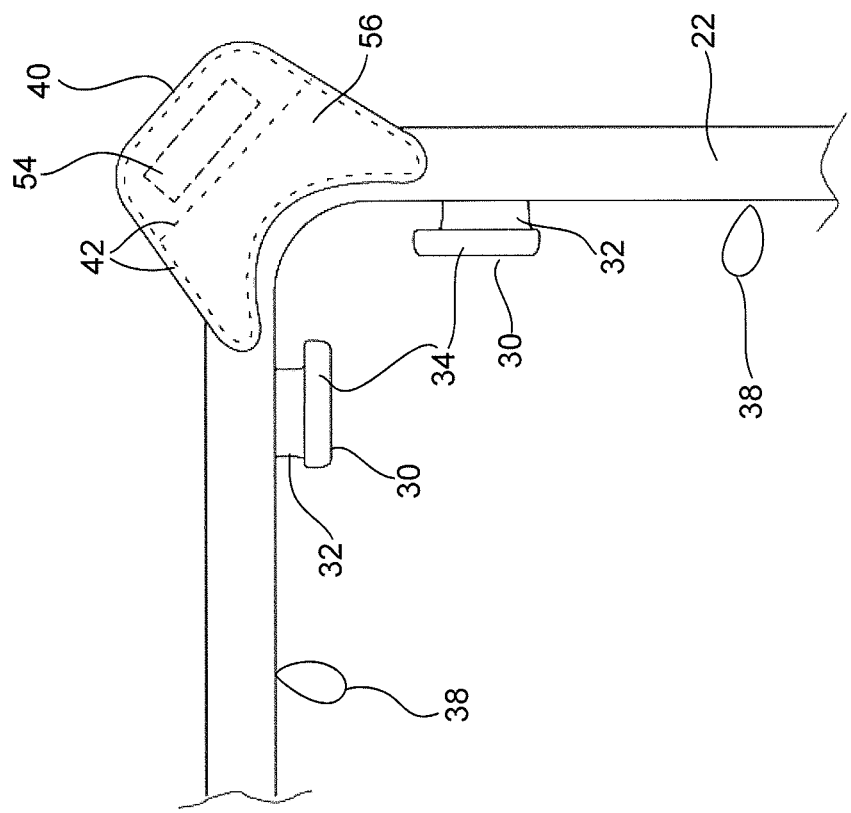
FIG. 6
FIG. 5

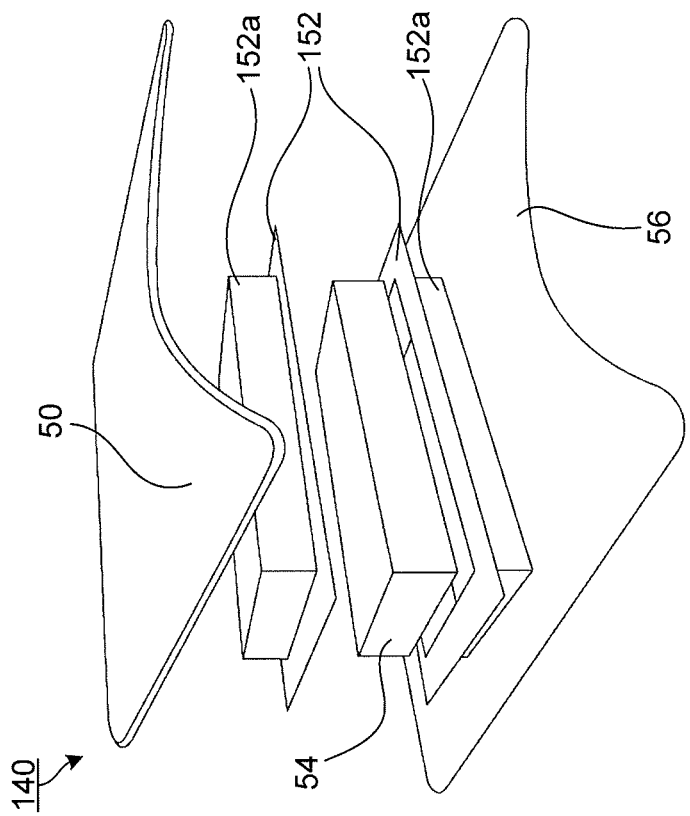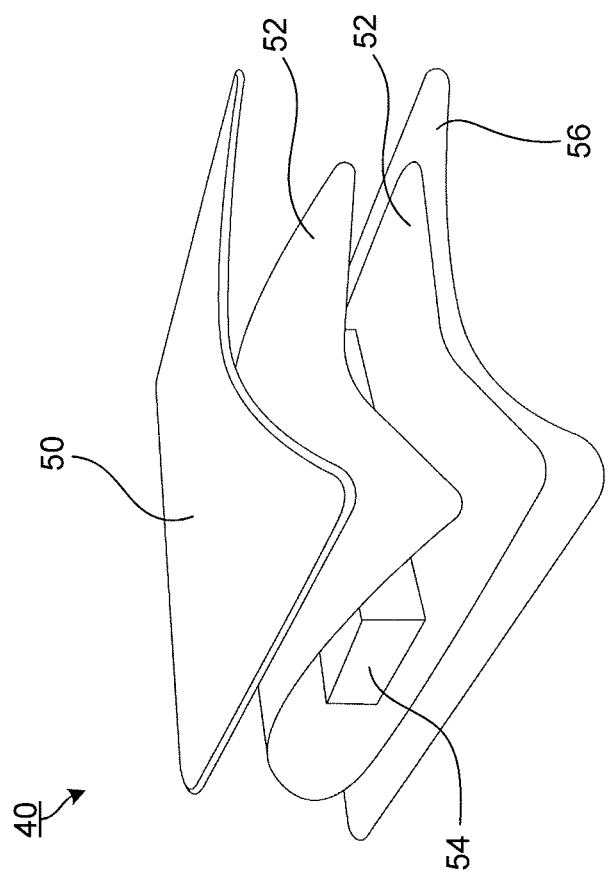

STRETCHABLE VEHICLE WINDOW SHADE

CROSS REFERENCE TO RELATED APPLICATIONS

This application incorporates and claims the benefit of the filing date of U.S. Provisional Patent Application Ser. No. 62/812,805, entitled "STRETCHABLE VEHICLE WINDOW SHADE" filed Mar. 1, 2019 and U.S. Provisional Patent Application Ser. No. 62/665,428, entitled "STRETCHABLE VEHICLE WINDOW SHADE" filed May 1, 2018, the entirety of which are incorporated herein by reference.

TECHNICAL FIELD

The subject disclosure relates to the field of window shades that are attachable to a vehicle window or vehicle door, and in particular a stretchable vehicle window shade that attaches to the vehicle window or vehicle door.

BACKGROUND

Window shades for vehicles have been used in a variety of formats, beginning with those that are simple rectangles of a light blocking, natural or synthetic fabric. These sheets of fabric may be attached to the window by various attachment mechanisms that typically allow for the fabric to be attached, detached, and reattached at will. Other, more permanent light blocking processes such as window tinting is also known. Window tinting is an example of technology in permanent window shades in that it is known that lining a vehicle window with a polymeric sheet that fits directly against the window will block certain frequencies of light from entering the vehicle. Window tinting is generally considered an unremovable, permanent shading for a vehicle as the tinting is very difficult to remove once applied.

These prior attempts at a convenient vehicle window shade still do not address the problem in the art of a conveniently and stably attached window shade that encompasses and adapts to the shape of an entire vehicle window.

SUMMARY

The following presents a simplified summary of the subject disclosure in order to provide a basic understanding of some aspects thereof. This summary is not an extensive overview of the various embodiments of the subject disclosure. It is intended to neither identify key or critical elements of the subject disclosure nor delineate any scope thereof. The sole purpose of the subject summary is to present some concepts in a simplified form as a prelude to the more detailed description that is presented hereinafter.

One or more embodiments of the subject disclosure provides a stretchable window shade for attachment to a door frame of a vehicle. The stretchable vehicle window shade includes a stretchable panel, magnets and retainers to secure the stretchable window shade to the door frame.

To the accomplishment of the foregoing and related ends, the subject disclosure comprises the features hereinafter fully described. The following description and the annexed drawings set forth in detail certain illustrative aspects of one or more embodiments of the disclosure. However, these aspects are indicative of but a few of the various ways in which the principles of the subject disclosure may be employed. Other aspects, advantages and novel features of the subject disclosure will become apparent from the following detailed description of various example embodiments of the subject disclosure when considered in conjunction with the drawings.

BRIEF DESCRIPTION OF DRAWINGS

FIG. 5 shows a magnified back view of the corner in FIG. 4.

FIG. 6 shows an isometric view of the corner in FIG. 4.

FIG. 9 shows an exploded view of a tab in FIG. 6.

FIG. 9A shows an exploded view of another tab.

DETAILED DESCRIPTION

Figure 1:
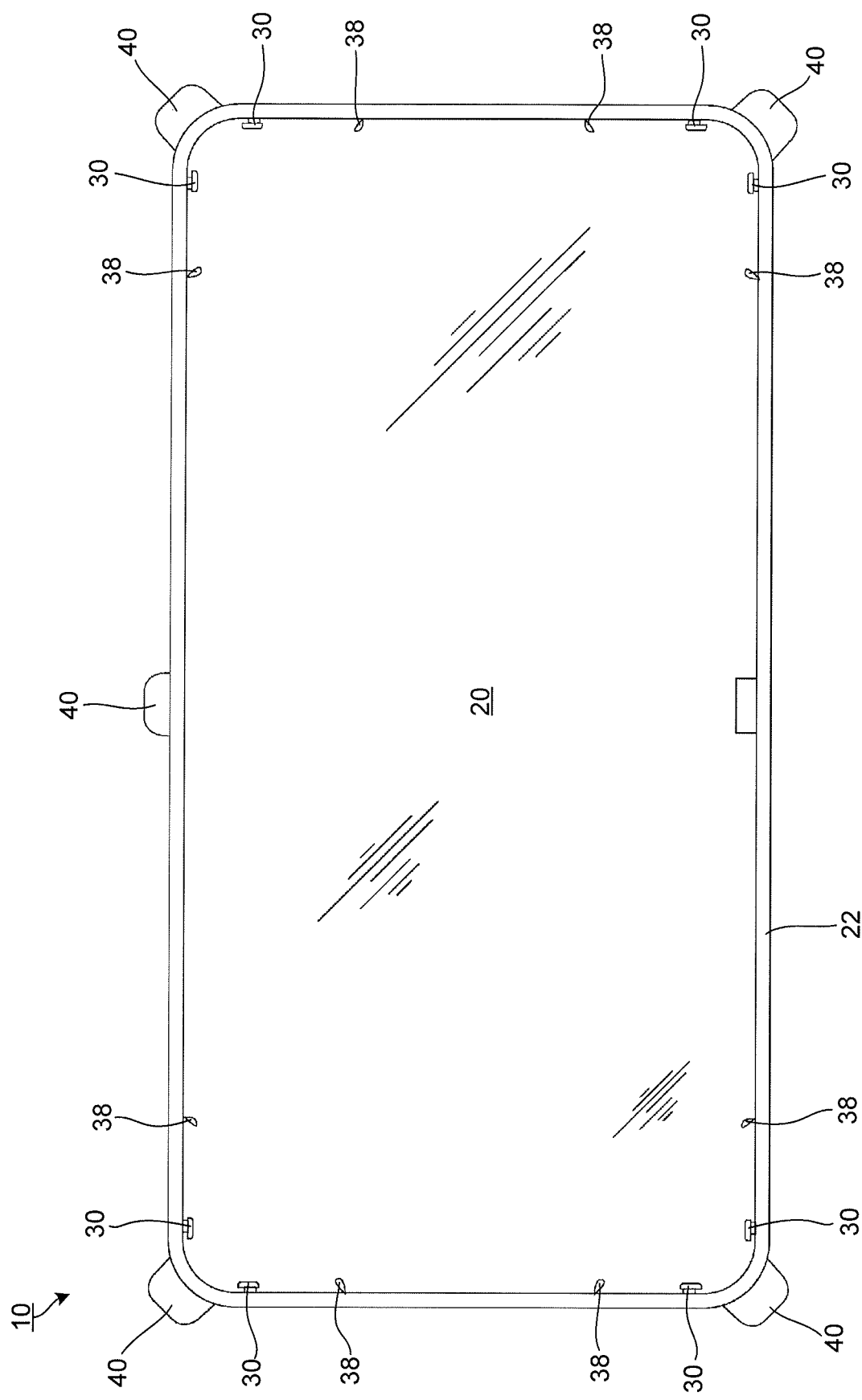
FIG. 1 shows a front view of a stretchable vehicle window shade in a first position according to this subject disclosure.

The subject disclosure is described with references to the drawings, wherein like reference numerals are used to refer to like elements throughout. In the following description, for purposes of explanation, numerous specific details are set forth in order to provide a thorough understanding of the present disclosure. It may be evident, however, that the present disclosure may be practiced without these specific details.

FIG. 1 shows an exemplary stretchable vehicle window shade 10. The window shade 10 may have a panel 20 bordered by a frame 22. The frame 22 may have a hook 30 and a loop 38 structure disposed thereon or therethrough. Similarly, the panel 20 or frame 22 may have a positioning tab 40 disposed thereon or therethrough.

Figure 3:
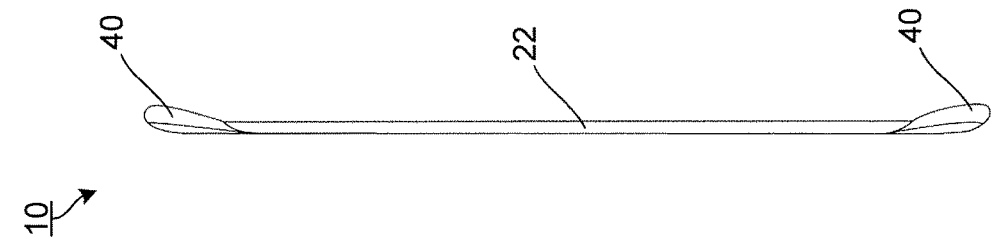
FIG. 3 shows a side view of FIG. 1.
Figure 2:
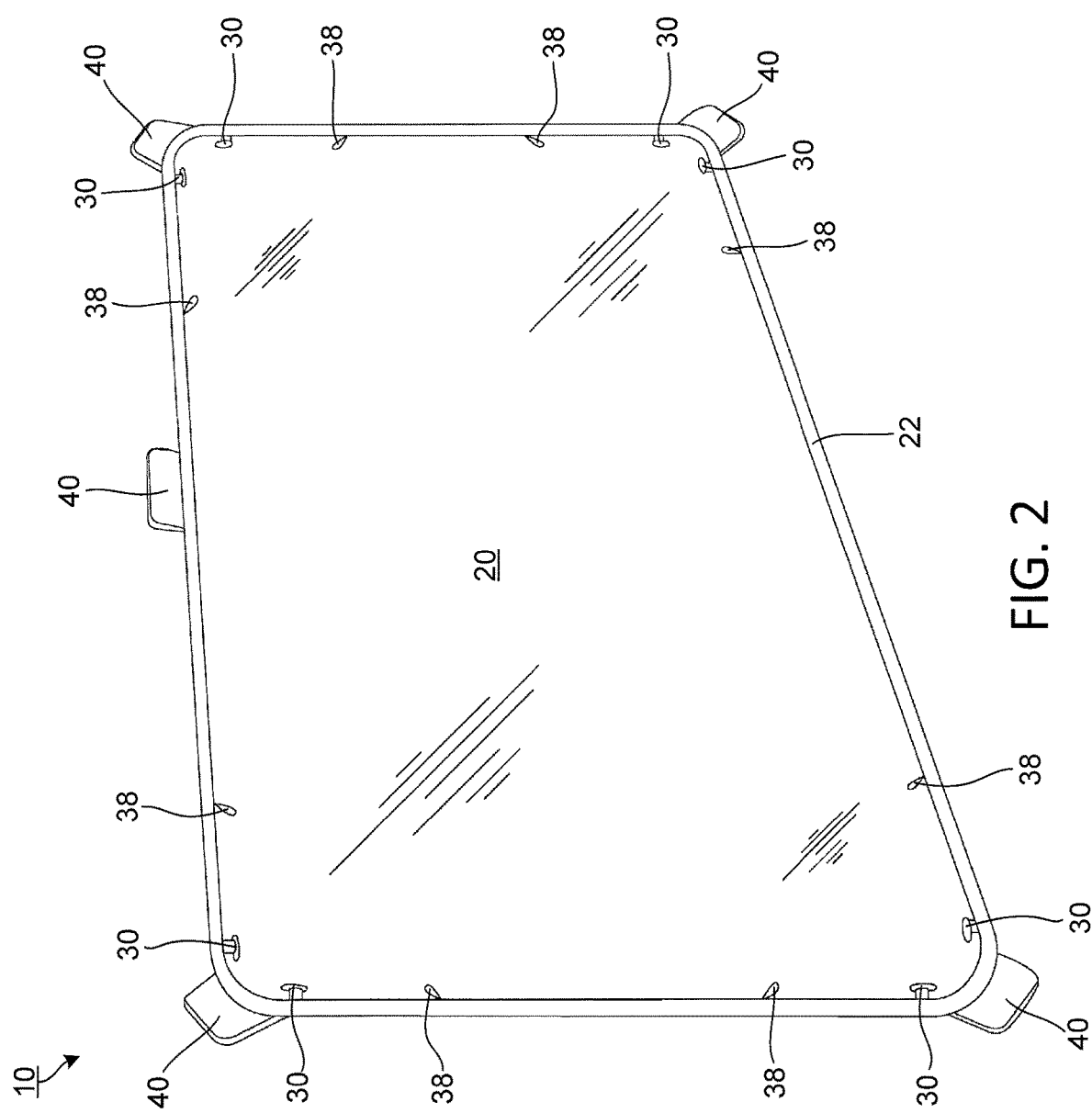
FIG. 2 shows a perspective view of FIG. 1.

FIGS. 1-3 demonstrate that the panel 20 of the window shade 10 may have a large surface area to cover an entirety and/or a substantial portion of a vehicle window 92 in a vehicle door 90 (FIGS. 12-18). Despite the large surface area, the panel 20 of the window shade 10 may be thin to reduce the total volume of the window shade 10. Although shown as substantially rectangular, it is to be understood that the panel 20 may have any geometric shape and/or perimeter that provides the ability to cover an entirety and/or a substantial portion of the vehicle window 92.

The panel 20 is capable of stretching to fit different shapes of the vehicle window 92 to help block sunlight, prevent UV exposure, and cool the temperature of the vehicle interior. In other words, the panel 20 may be constructed so as to allow both the ability to stretch to a larger size and shrink to a resting size. Similarly, the panel 20 may be constructed to be thinner or thicker to allow for different levels of sunlight blockage, UV exposure and temperature control. Additionally, the panel 20 may be made of an elastic material such as, but not limited to, polyester, nylon, cotton and/or any other suitable material according to this subject disclosure.

Similarly, FIGS. 1-3 further demonstrate that the frame 22 has a perimeter shape similar to that of the panel 20. The frame 22 is also capable of stretching to fit different shapes of the vehicle window 92 to allow the panel 20 to fit a variety of different shapes. The frame 22 may also be constructed to be thicker than the panel 20 to provide a stronger outer tubing perimeter and prevent tearing of the panel 20. Thus, the frame 22 may be constructed of an elastic material and/or a similar material as the panel 20 such as but not limited to, polyester, nylon, cotton and/or any other suitable material capable of being stretched according to this subject disclosure.

Figure 4A:
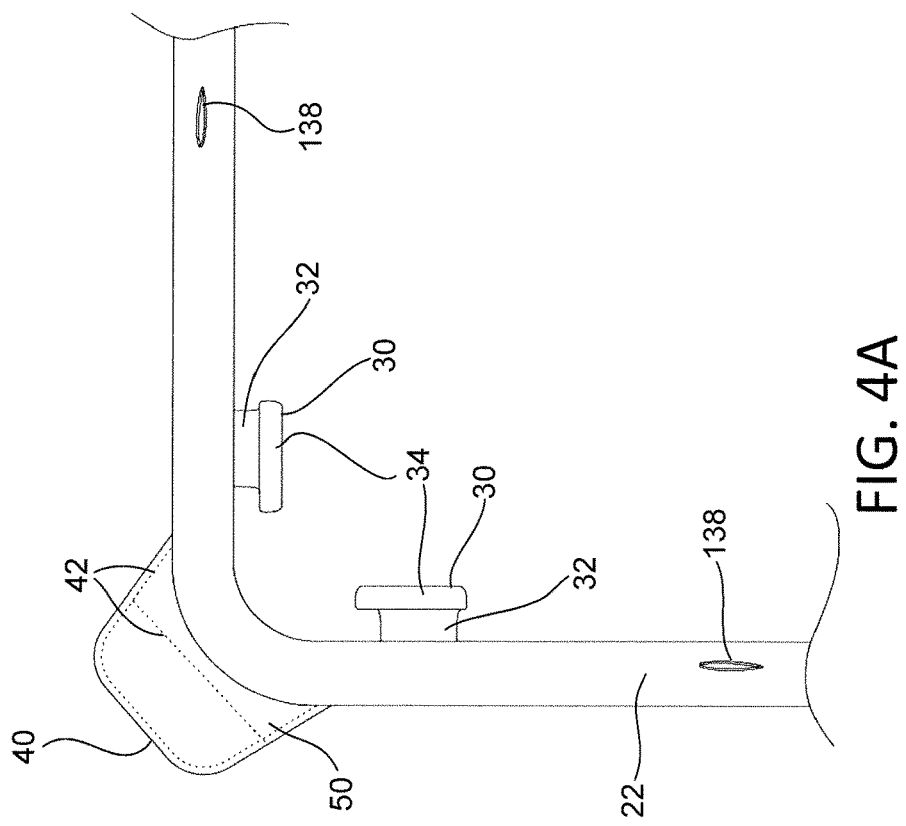
FIG. 4A shows a magnified front view of a corner of a stretchable vehicle window shade in a first position having a buttonhole.
Figure 4:
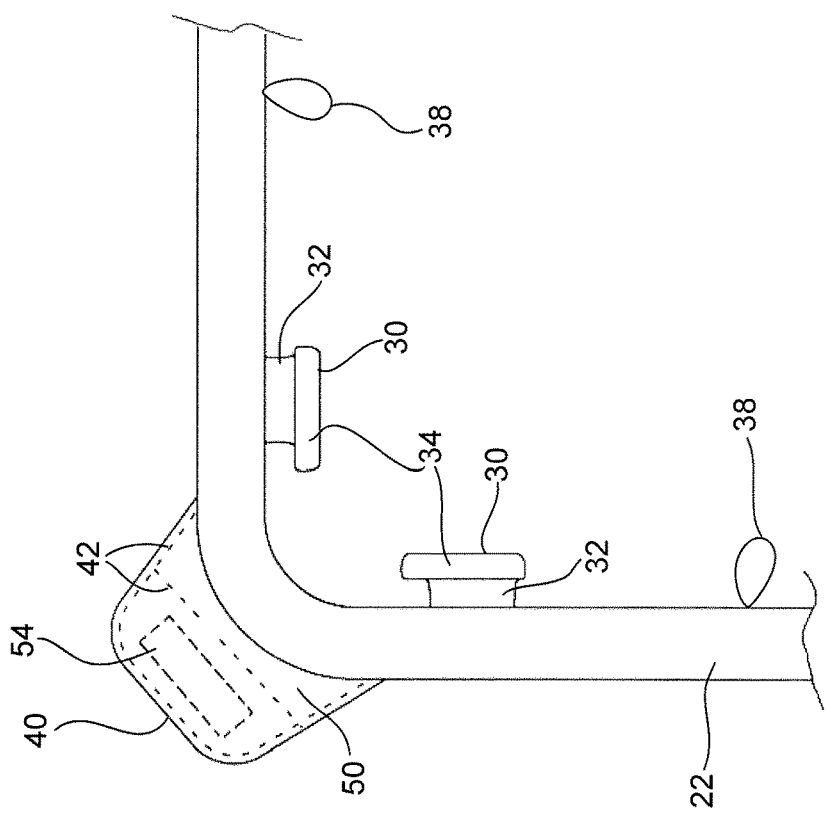
FIG. 4 shows a magnified front view of a corner in FIG. 1.
Figure 8:
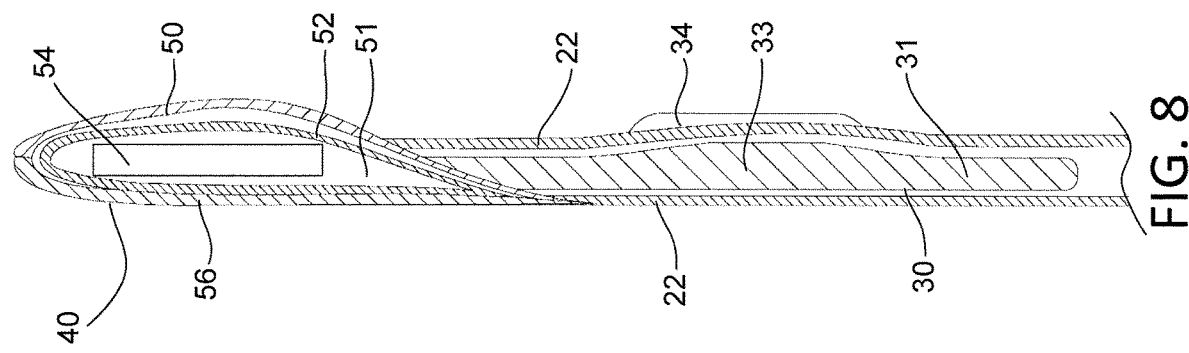
FIG. 8 shows a cross-sectional view along A-A in FIG. 6.

FIGS. 4-5 show that one or more hooks 30 and loops 38 may be used together to form hook 30 and loop 38 structures, which may be disposed through the frame 22. The hook 30 may have a hook neck 32 and a hook end 34. The hook 30 are constructed to allow for mating with the loops 38. The hook neck 32 may be constructed thinner than the hook end 34. Thus, when the loops 38 are engaged with the hooks 30, the loops 38 may rest against the hook necks 32 and are secured by the hook end 34 to prevent the loops 38 from falling away from the hook 30. Best shown in FIG. 15, the engagement between the hook 30 and the loop 38 creates a fold 24 that reduces the planar surface area of the panel 20. Thus, the mating between the hook 30 and the loop 38 further adds to the flexibility and adaptability of the window shade 10 to windows 92 of varying sizes and shapes. However, it is to be understood that other alternatives may fall within the scope of this application, such as a hook neck having a recess to receive a loop, a buckle, a knot and loop mechanism, a button and hole/loop configuration and/or any other single or combination of similar mechanisms that provide an engagement between two points that are adjacent to the frame 22 to reduce the total distance between the two points. For example, FIG. 4A demonstrates a hook 30 and buttonhole 138 assembly.

The hook 30 may be constructed of a rigid or semi-rigid material to provide a suitable structure to retain or secure the loop 38. For example, the hook 30 may be constructed of a thermoplastic elastomer (TPE), polyethylene (PE), plastic, rubber, wood, metal or any other suitable material that allows for a structure to retain the loop 38. The loops 38 may be elastic, string and/or any other suitable material.

Figure 7:
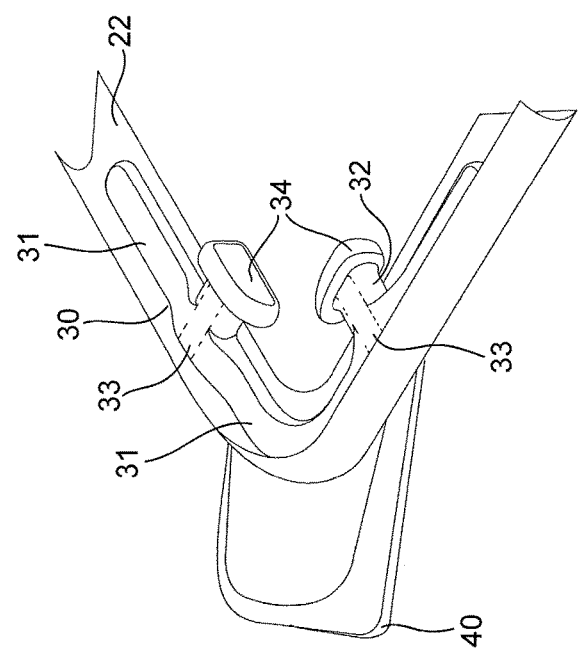
FIG. 7 shows an upper perspective isometric view of the corner in FIG. 6.

Referring back to FIGS. 6-7, the hook 30 may have a hook base 31 that provides further stability to the frame 22. The hook base 31 may be shaped substantially similar to a portion of the frame 22, such that the frame 22 may receive and secure the hook base 31. Similarly, the frame 22 may be flexible enough to mold to the shape of the hook base 31, such that the frame 22 is secured around the hook base 31. Furthermore, the hook base 31 provides structure to the frame 22 and prevents unwanted deformations and/or tearing of the frame 22. Like the hook 30, the hook base 31 may be constructed of a rigid or semi-rigid material. Although the hook base 31 is shown to be of a substantially c-shape, it is to be understood that the hook base 31 may take a variety of different geometric shapes and sizes to provide stability to the frame 22. For example, the hook base 31 may be substantially cylindrical to accommodate a straight edge along the frame 22 (the region under the centermost positioning tab 40 in FIGS. 10A and 10B). For yet another example, the hook base 31 may have an arch shape to accommodate curvy or non-straight edges of the vehicle door 90.

The hook 30 may further have a thickened base 33 in a portion of the hook base 31. The thickened base 33 reinforces and provides additional strength to a portion of the hook base 31 to prevent degradation of the hook 30 during and/or after repeated and/or constant usage of the hook 30 and the loop 38 mechanism. The thickened base 33 may be of the same material as the hook base 31 or may be of a different material to provide further reinforcement. However, it is to be understood that a weaker material and/or a thinner base portion that provides further flexibility may also be used.

FIGS. 4-9 show that the window shade 10 may have one or more positioning tabs 40. The positioning tabs 40 may be constructed of multiple layers. Referring to FIG. 9 particularly, the positioning tab 40 may have a front layer 50, an inner layer 52, a magnet 54 and a back layer 56. Although shown as attached by stitches 42, these layers 50, 52, 56 may be attached together in a variety of different constructions, such as through adhesives, heat sealing, ultrasonic sealing and/or other sealing methods.

The front layer 50 of the positioning tab 40 provides shock absorption for the positioning tabs 40. When installed, a user may open and close the vehicle door 90 many times. The front layer 50 thus dampens and absorbs the shock from the traumatic impacts of the vehicle door 90 being closed and/or potentially slammed repeatedly. Similarly, the front layer 50 also dampens and absorbs the shock from the constant vibrations and impacts from driving, especially over rough terrain causing further potential to damage either the vehicle window 90 and/or the magnet 54 of the positioning tab 40. Accordingly, the front layer 50 may be constructed of a variety of different materials, such as neoprene, propylene, rubber, PE or any other suitable material that dampens or absorb impact.

Beneath the front layer 50 may be an inner layer 52. The inner layer 52 may form a pocket 51 that may encase or secure the magnet 54. More specifically, the inner layer 52 may be folded over the magnet 54 to form the pocket 51. Distal ends of the inner layer 52 may then be sealed together to seal the pocket 51 around the magnet 54. Thus, the pocket 51 may provide the magnet 54 an isolated environment. By providing an isolated environment, the pocket 51 may be waterproof, which may prevent rusting and potential degradation of the magnet 54. Accordingly, the inner layer 52 may be constructed of a variety of materials to provide a waterproof environment, such as polyvinyl chloride (PVC), vinyl, rubber and/or any other suitable material that can isolate the magnet 54 therein. Similarly, the inner layer 52 may be sealed to form the pocket 51 by a variety of methods, such as adhesives, heat sealing, ultrasonic sealing and/or other sealing methods.

FIG. 9A shows that a positioning tab 140 may alternatively be constructed having a housing 152 in place of the inner layer 52. The housing 152 may be constructed in a clamshell blister configuration, such that housing portions 152a may be used to encase the magnet 54 within. The housing 152 similarly provides the magnet 54 an isolated environment. The isolated environment may also be waterproof, which may prevent rusting and potential degradation of the magnet 54.

The housing 152 and the housing portions 152a may be constructed of a variety of different materials, such as polyvinyl chloride (PVC), vinyl, rubber, hard plastics and/or any other suitable materials that can isolate the magnet 54 therein. To form the housing 152, the housing portions 152a may be sealed in a variety of different methods, such as using adhesives, sewing, heat sealing, ultrasonic sealing and/or other sealing methods.

Disposed within the inner layer 52 or the housing 152 is the magnet 54. The magnet 54 produce a magnetic field, which allows the magnet 54 to be magnetically attracted to the vehicle door 90 and allow the window shade 10 to secure along such.

Opposite the front layer 50 may be a back layer 56. The back layer 56 may provide additional shock absorption and a buffer that prevents scratching of the vehicle window 92 and/or vehicle door 90. The back layer 56, however, may also maintain and promote the strength of magnetic forces of the magnet 54. Thus, the back layer 56 may be of a thinner material, such as terry cloth, cotton, polyester, plastics and/or other such materials.

Taken together, the front layer 50, the inner layer 52 and/or the housing 152 and the back layer 56 provide an environment for the magnet 54 to strongly attach and secure to the vehicle door 90 and/or vehicle window 92 through strong magnetic forces. These layers 50, 52, 152, 56, further provide a double entrapment of the magnet 54, which provide a larger body for the magnet 54 and prevents any choking hazards to children and infants. Furthermore, the layers 50, 52, 152, 56 bolster the longevity of the magnet 54 through its shock absorption and the waterproof environment. Additionally, the various layers 50, 52, 152, 56 of the positioning tabs 40 may create a thin profile, which allows the positioning tabs 40 to fit between the vehicle door 90 and the remainder of the vehicle when the vehicle door 90 is shut.

Figure 10A:
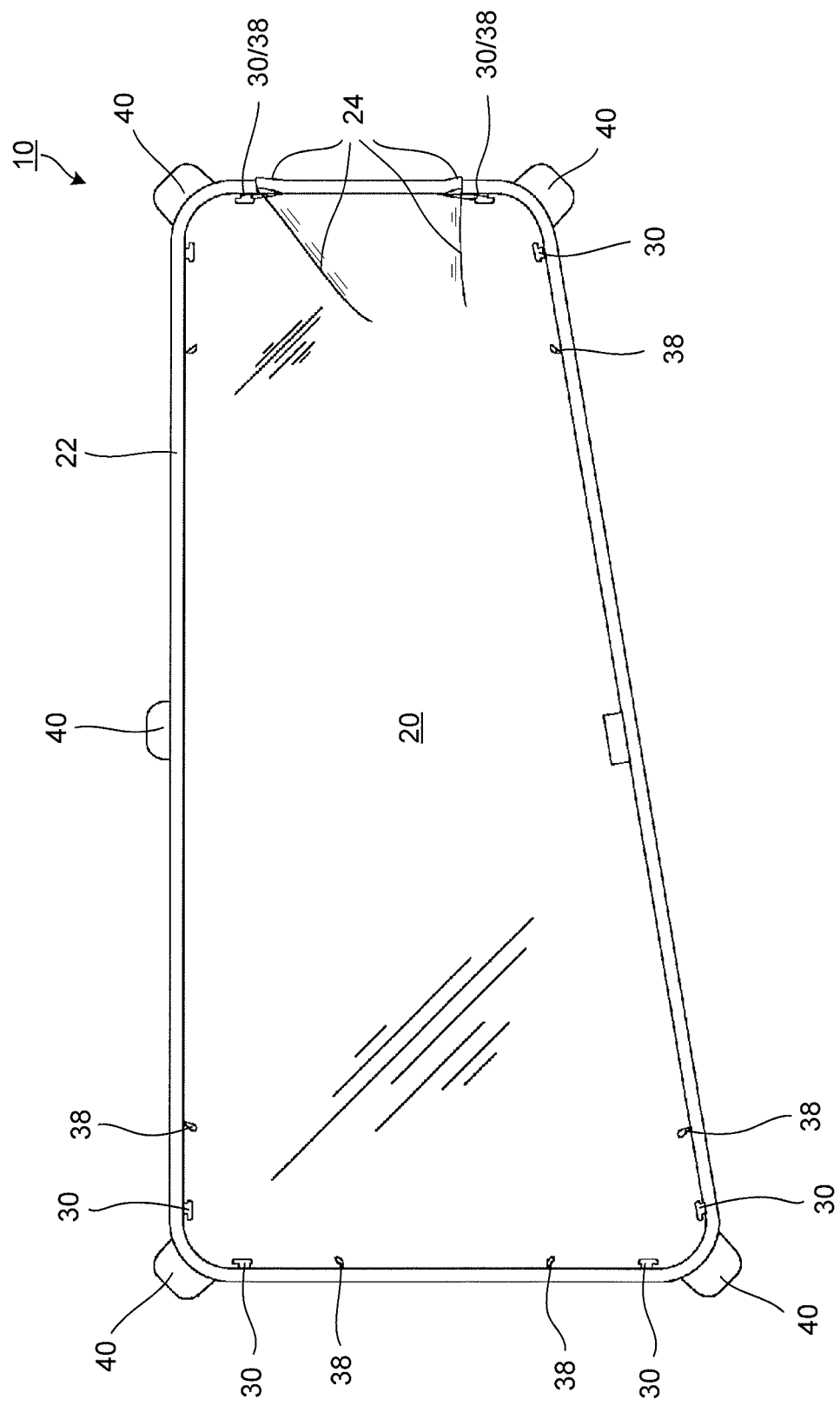
FIG. 10A shows a second position of the stretchable vehicle window shade in FIG. 1.
Figure 10B:
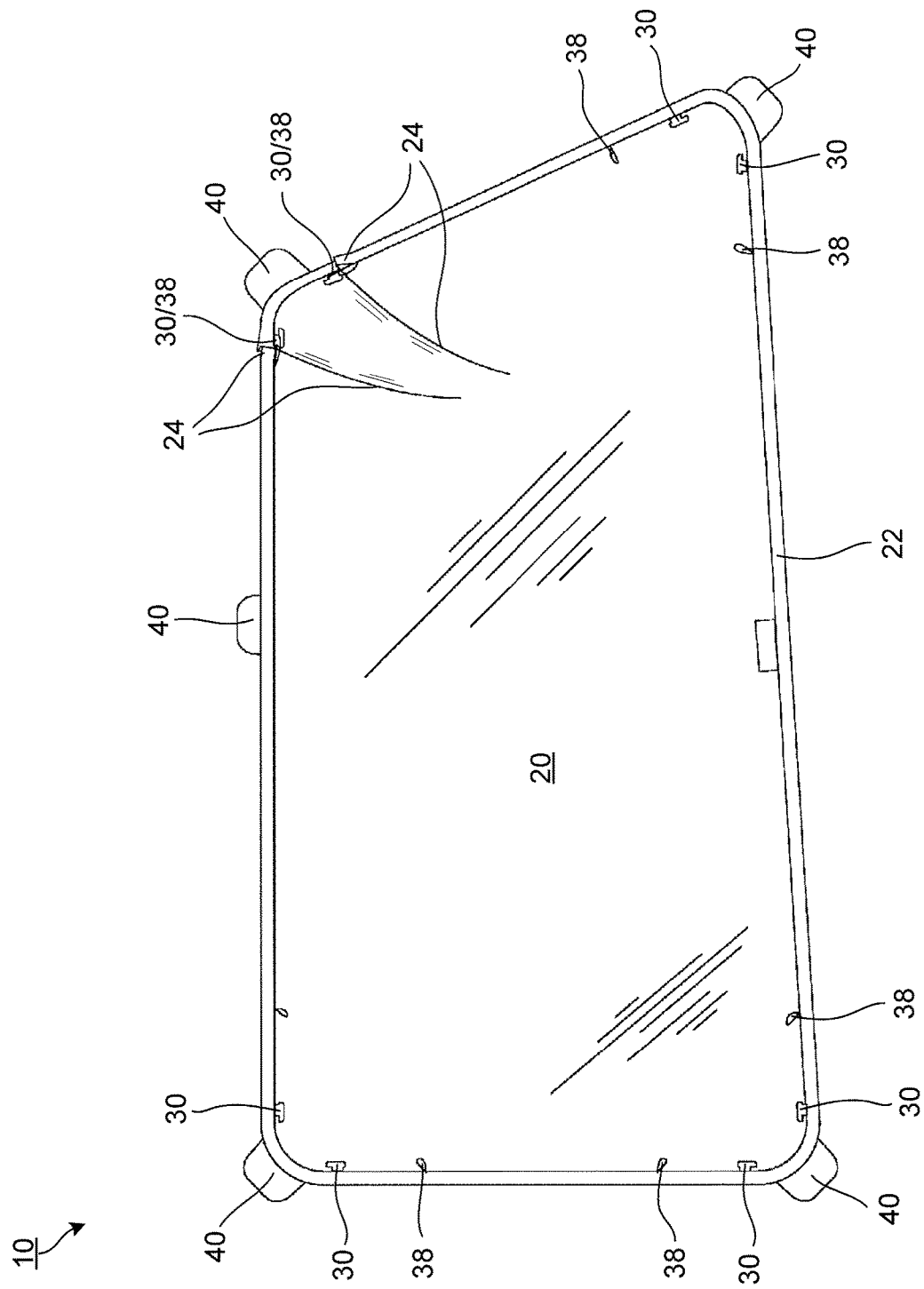
FIG. 10B shows a third position of the stretchable vehicle window shade in FIG. 1.

FIGS. 10A-10B illustrate the stretchable window shade 10 in several different use positions. The window shade 10 is shown in a modified configuration to interface with a window with smaller dimensions. For example, in one embodiment, the dimensions of the window shade 10 may be 14"×28". The window shade 10 may then also be stretched and/or configured to a larger or smaller vehicle window 92. As discussed above, the loops 38 located along the frame 22 of the window shade 10 wrap around the hooks 30 adjacent to the positioning tabs 40 to decrease the overall size of the window shade 10 thereby creating folds 24 along the frame 22 and the panel 20. FIG. 10A demonstrates the usage of the hook 30 and loop 38 structure along a width of the window shade 10, while FIG. 10B demonstrates the usage of the hook 30 and loop 38 mechanism along both a length and width of the window shade 10. However, it is to be understood that the hook 30 and loop 38 mechanism can alter only the length, only the width and/or a combination of the two dimensions. Thus, the usage of the hook 30 and loop 38 structures provide the ability to narrow both the width and length of the window shade 10. In other words, the size of the window shade 10 can be decreased by width, length or both in order to properly cover the vehicle window 92 with smaller dimensions through the usage of folds 24. Similarly, the window shade 10 can take a variety of different shapes by utilizing the hooks 30 and loops 38 structure to create folds 24 in a variety of different combinations.

FIGS. 11-18 demonstrate a series of step that a user may take to install the window shade 10 onto the vehicle door 90 and/or the vehicle window 92.

Figure 11:
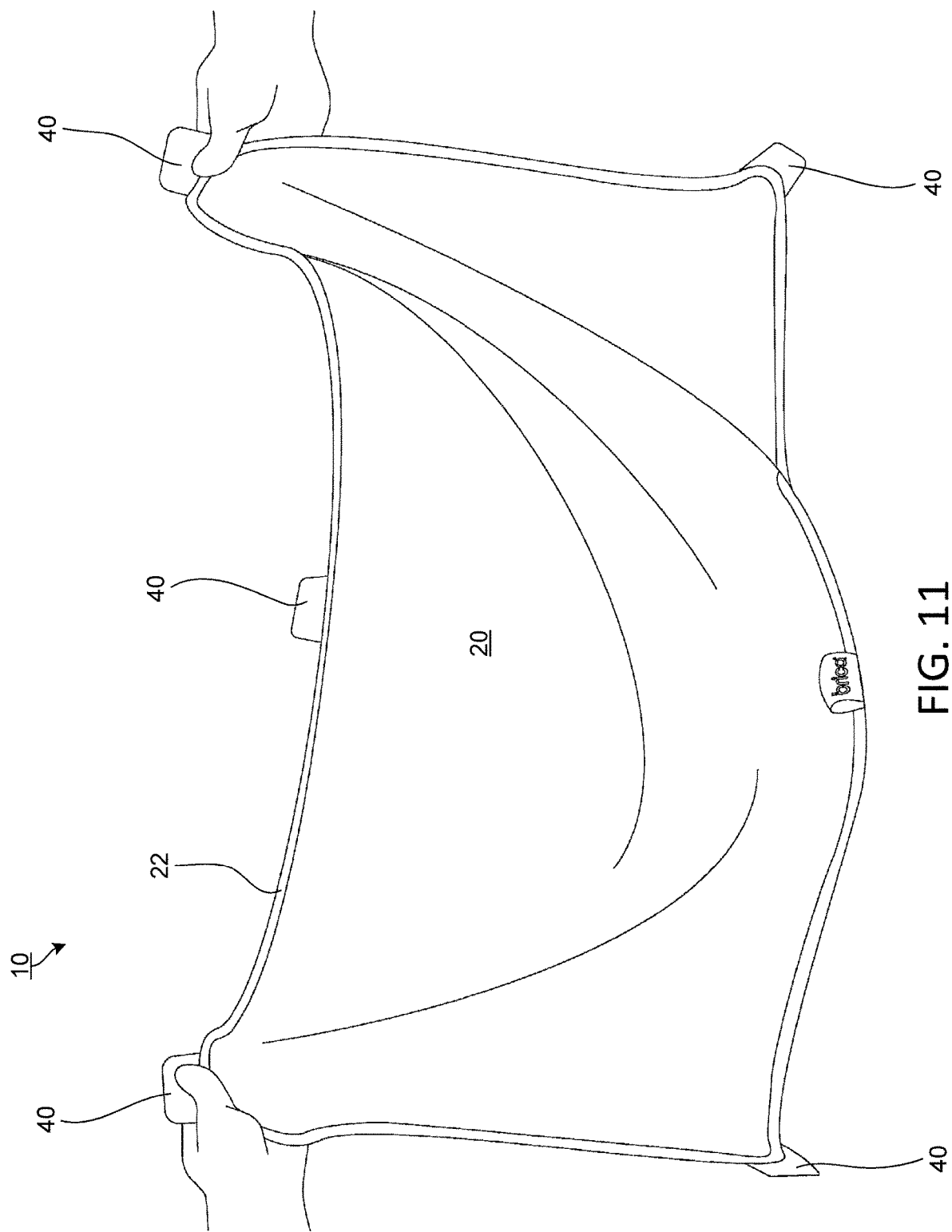
FIG. 11 shows a first step of installing the stretchable vehicle window shade.

FIG. 11 shows the user holding the window shade 10 at opposite ends of the window shade 10. Prior to any stretching or usage of the hooks 30 and loops 38 structure, the window shade 10 retains a resting surface area.

Figure 12:
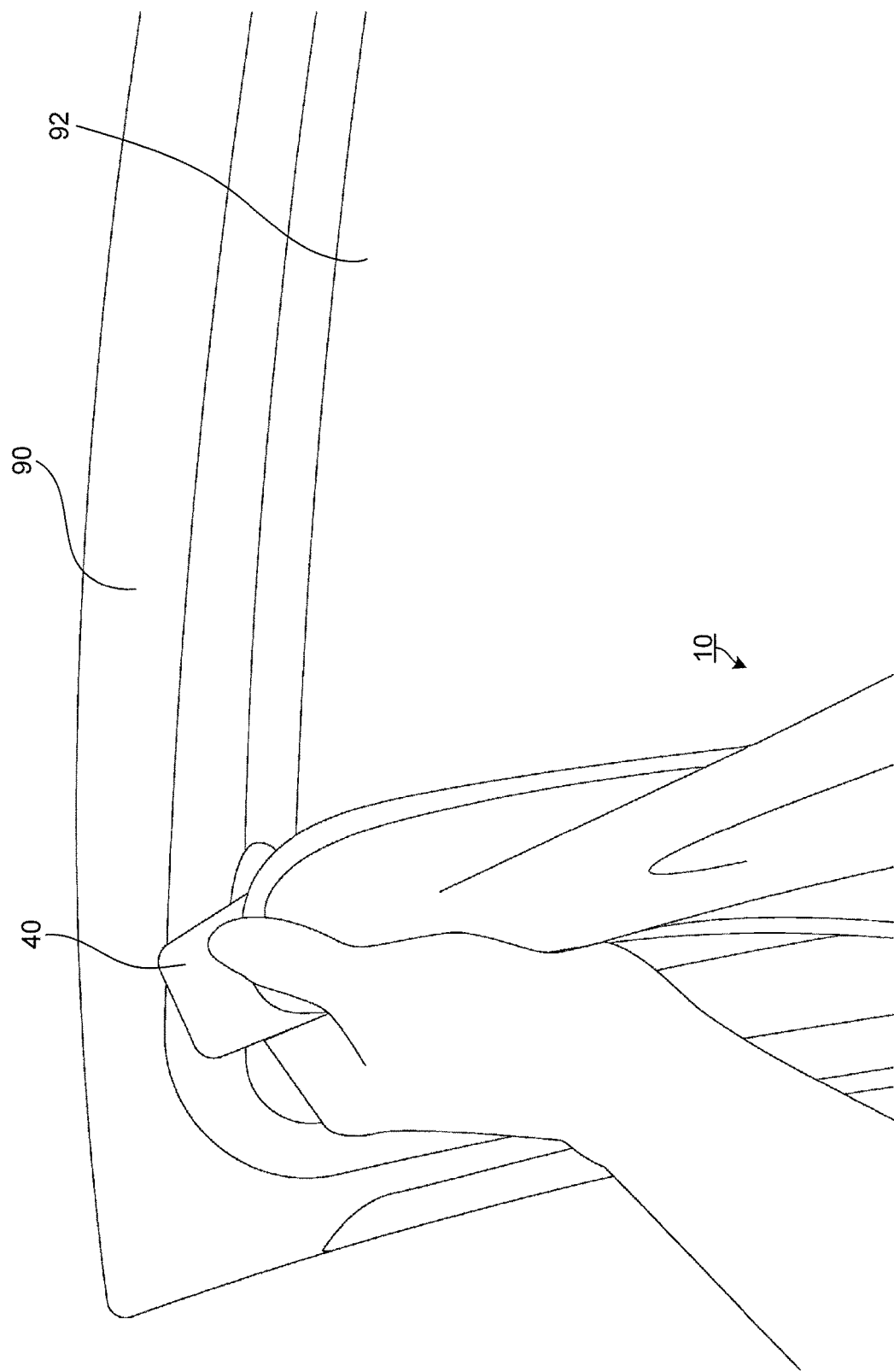
FIG. 12 shows a second step of installing the stretchable vehicle window shade.

FIG. 12 shows the user attaching one positioning tab 40 to a corner of the vehicle door 90 and adjacent to the vehicle window 92. As discussed above, the magnet 54 of the positioning tab 40 provides a magnetic force that is attracted to a metal of the vehicle door 90. Thus, the positioning tab 40 may be securely attached to the metal of the vehicle door 90.

Figure 13:
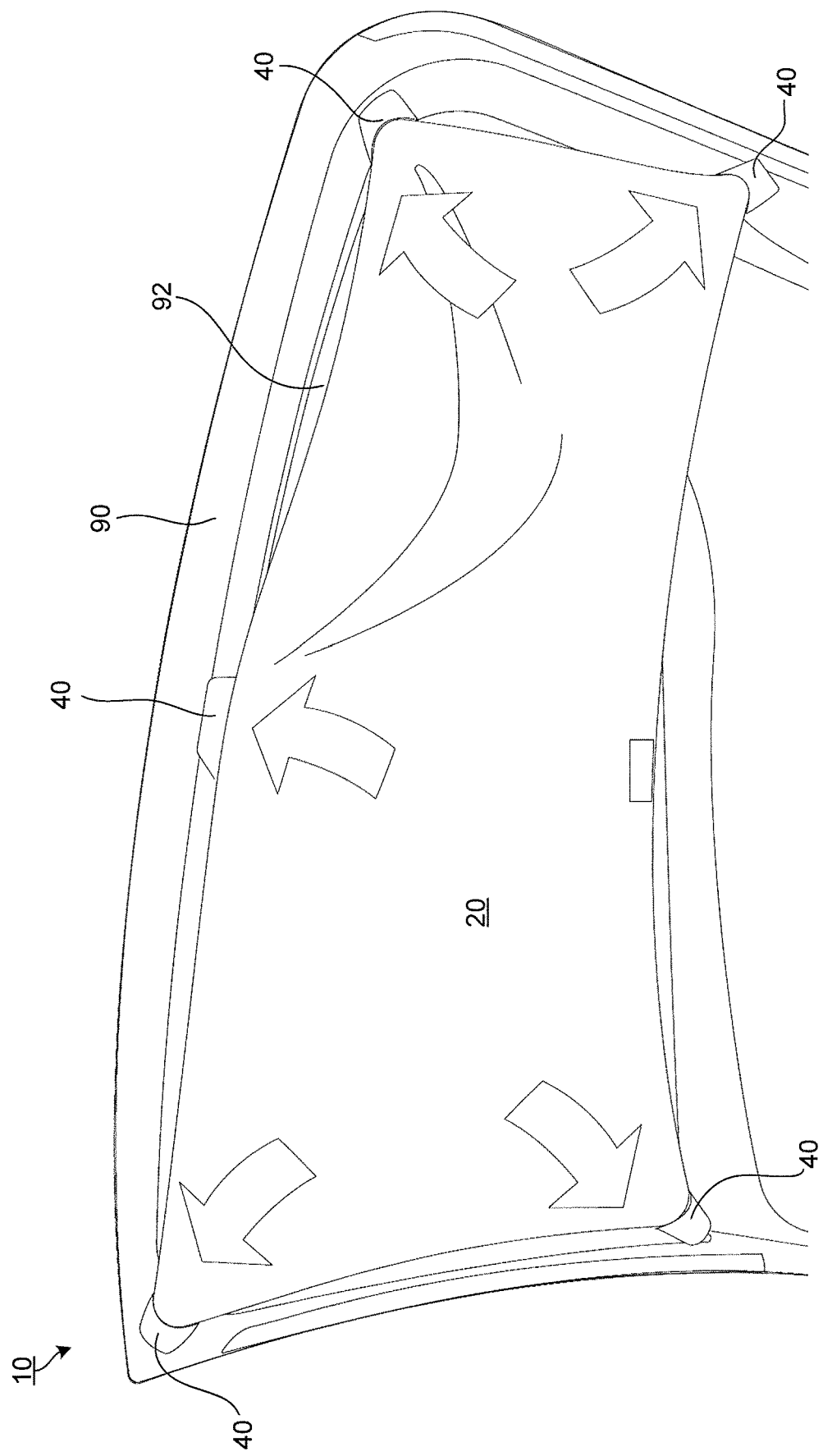
FIG. 13 shows a third step of installing the stretchable vehicle window shade.

FIG. 13 demonstrates the expansion and flexibility of the window shade 10. The window shade 10 is shown to be attached to various points of the vehicle door 90 so that the vehicle window 92 is obscured by the window shade 10. FIG. 13 further contemplates that the strength of the magnet 54 overcomes the elasticity of the window shade 10 such that the window shade 10 may stay securely in place despite the window shade being stretched and extended beyond its resting surface area. In other words, the magnetic force from the magnet 54 overcomes the counteracting resultant force of the stretched window shade 10. Likewise, the magnetic force allows the window shade 10 to stretch to a large surface area by securely fastening the frame 22 to various points of the vehicle door 90 in a fully extended position. Similarly, the magnetic attraction between the magnet 54 and the vehicle door 90 allow the window shade 10 to remain securely in place when the vehicle window 92 is in an open position. In other words, the magnetic attraction between the magnet 54 and the vehicle door 90 may be sufficiently strong enough to withstand atmospheric forces through the open vehicle window 92 when the vehicle is travelling at high speeds or over rough terrain.

Figure 14:
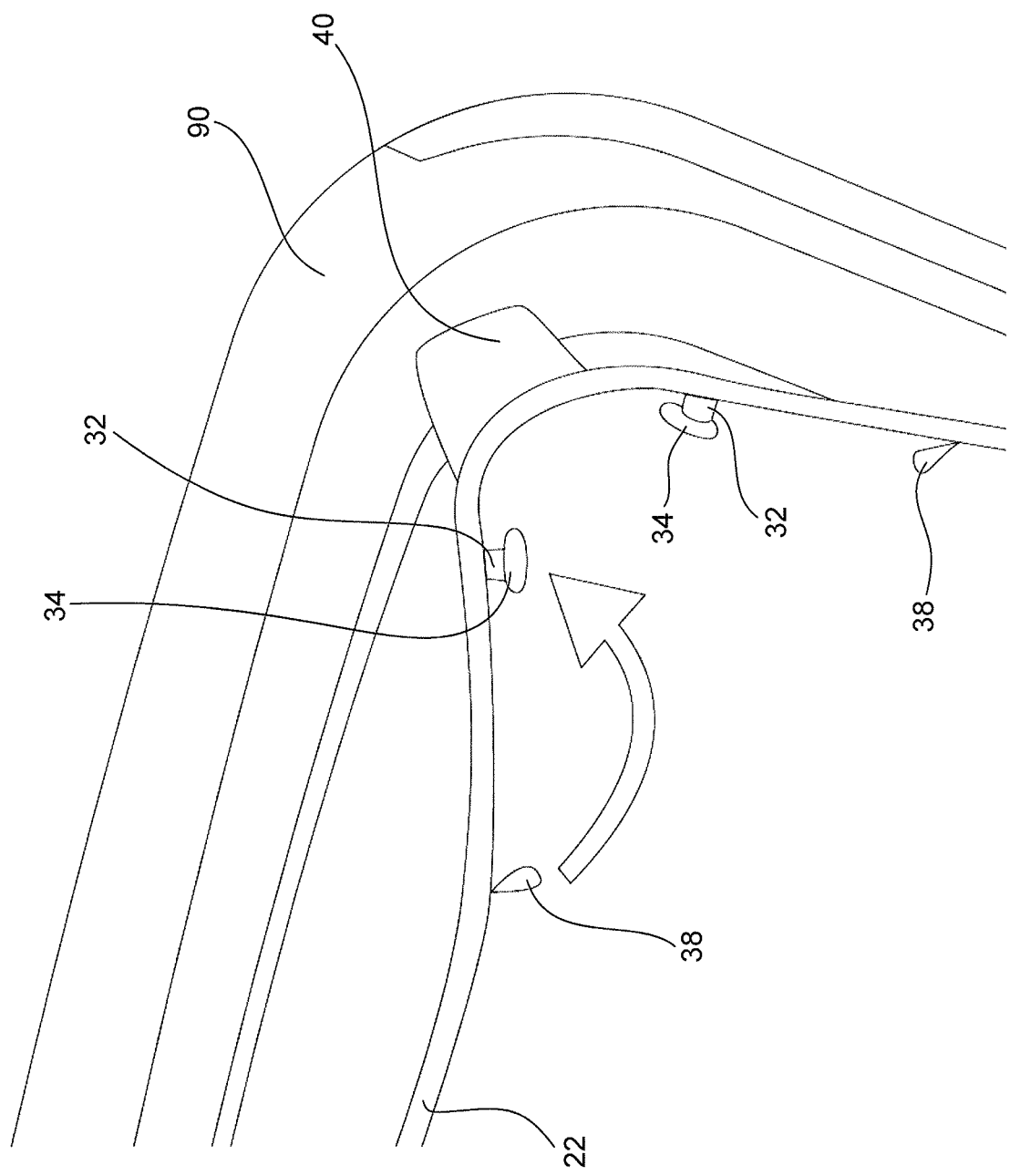
FIG. 14 shows an optional fourth step of installing the stretchable vehicle window shade.
Figure 14A:
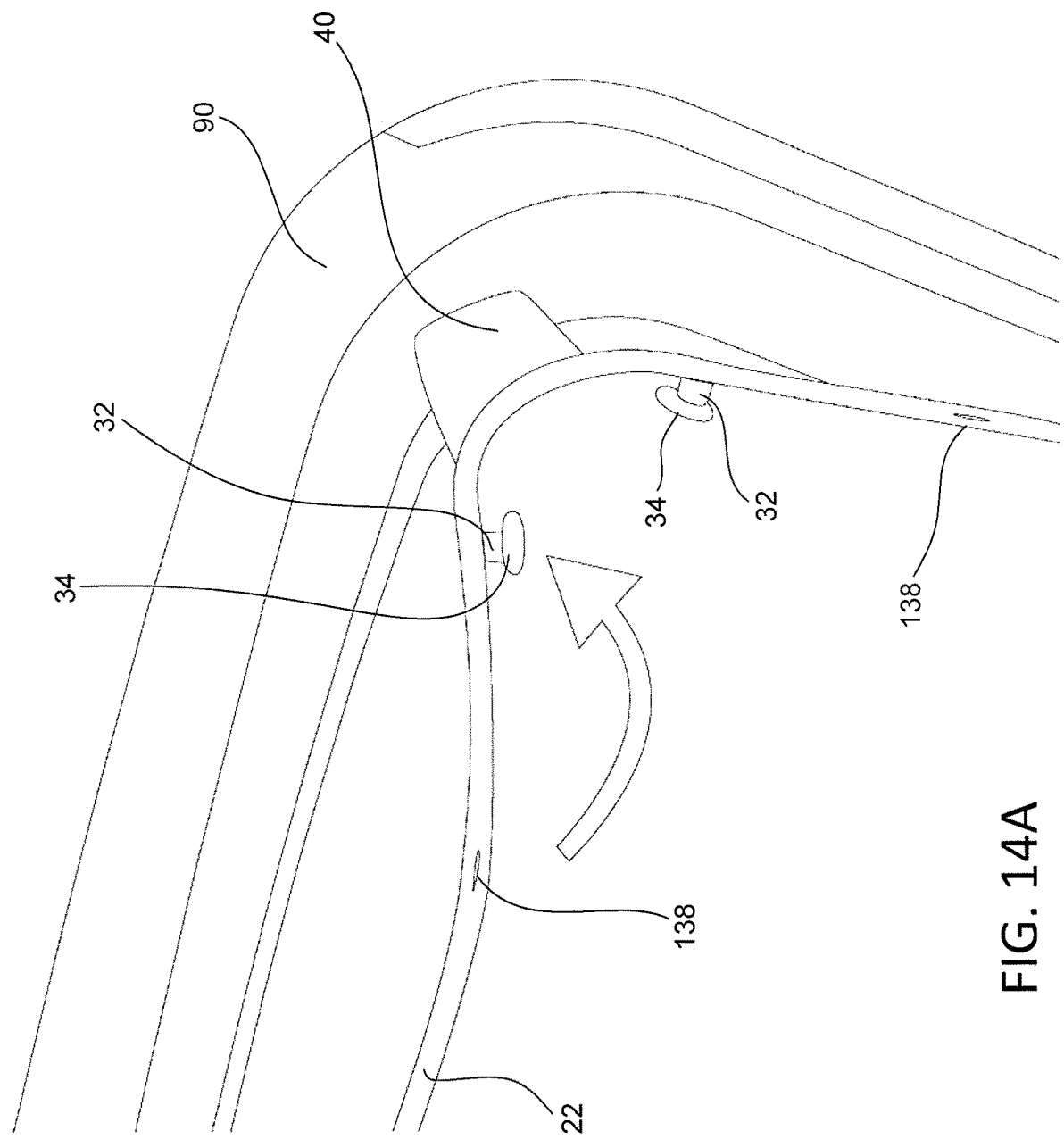
FIG. 14A shows an optional fourth step of installing a stretchable vehicle window shade having a buttonhole.
Figure 15:
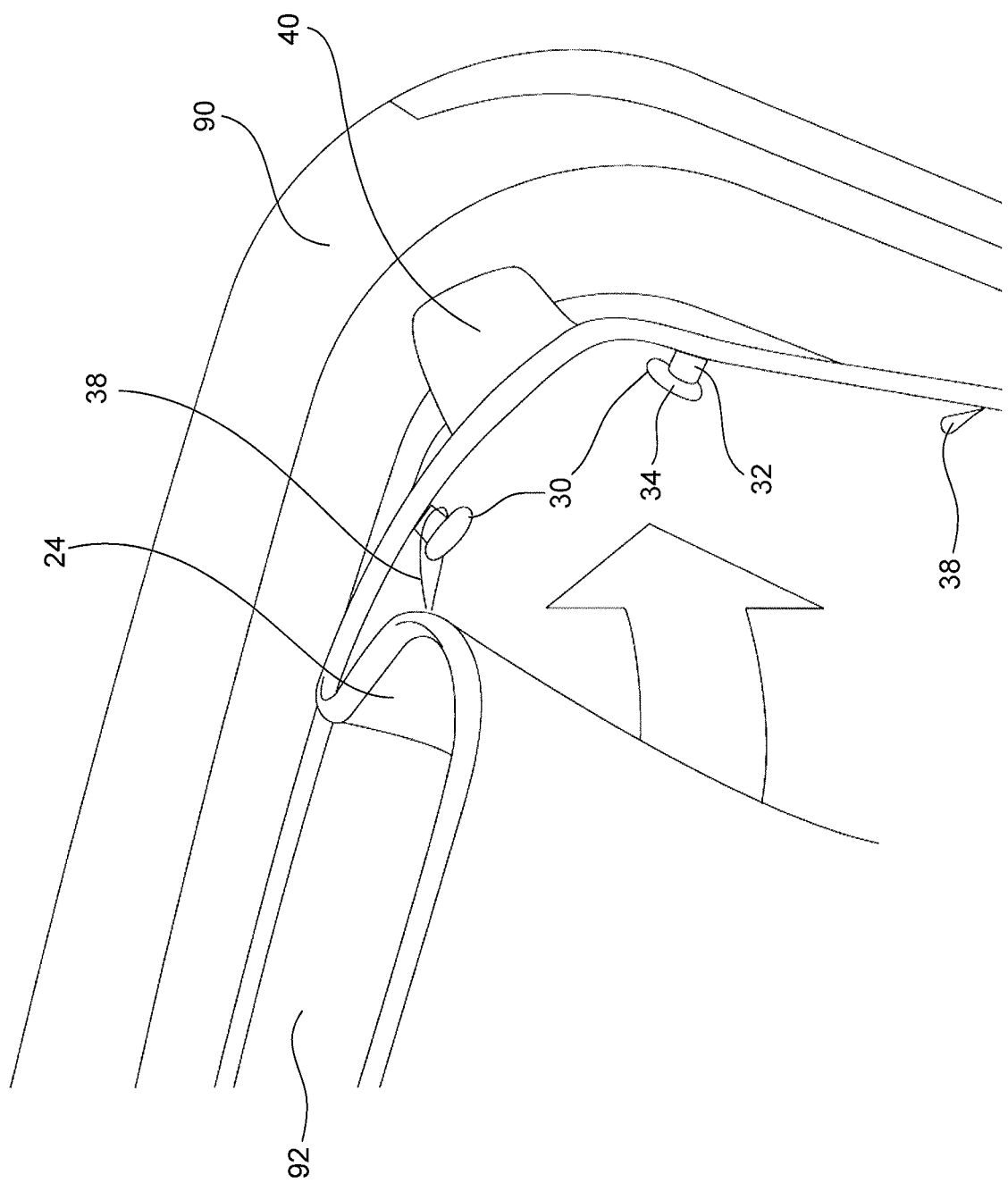
FIG. 15 shows an optional fifth step of installing the stretchable vehicle window shade.
Figure 15A:
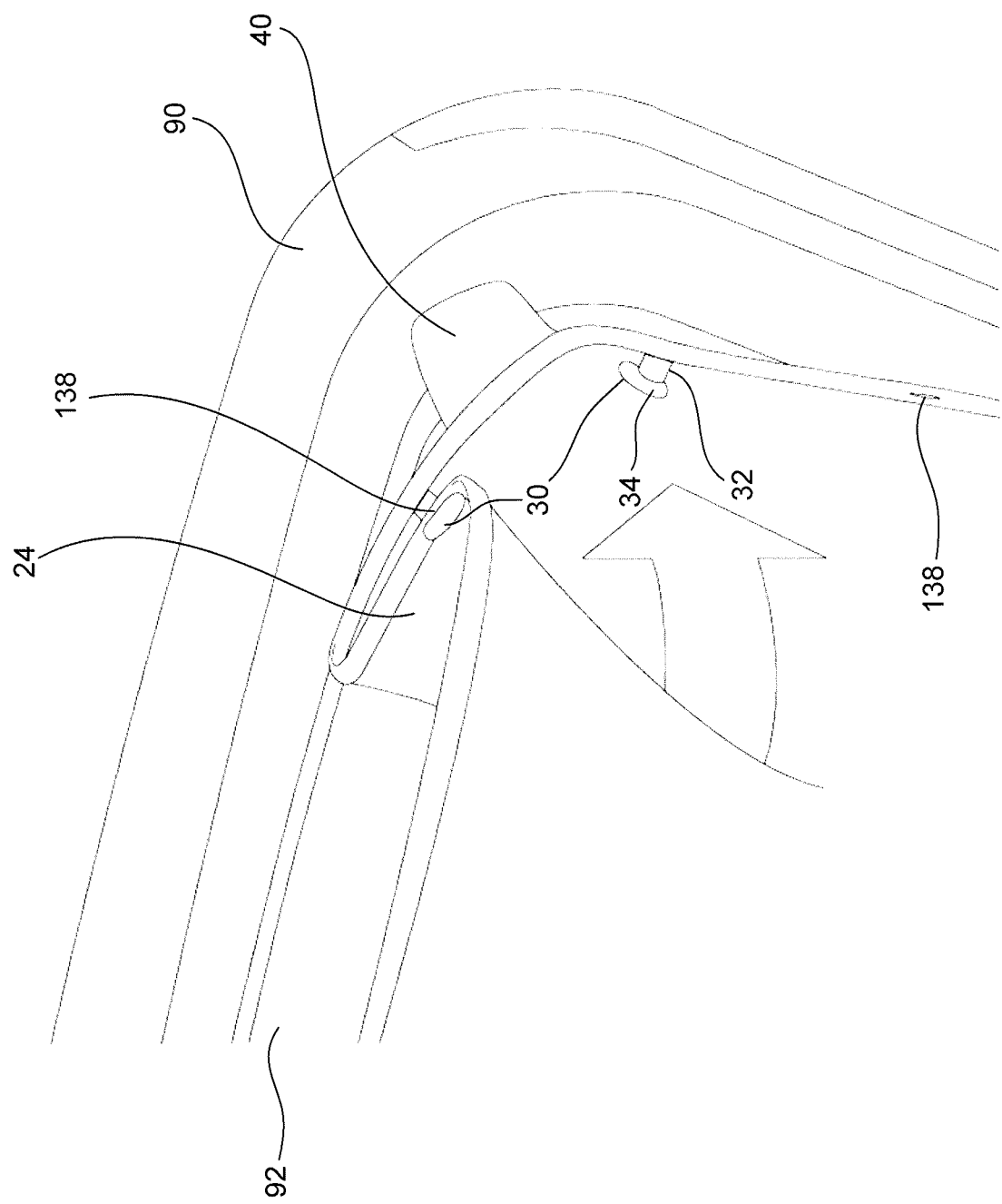
FIG. 15A shows an optional fifth step of installing the stretchable vehicle window shade of FIG. 14A.

FIGS. 14 and 15 portray the actions the user may take to engage the hook 30 and the loop 38 structures. As discussed above, the loop 38 may wrap around the hook 30, creating the fold 24. The fold 24 then provides further customization to the frame 22 and the panel 20 of the window shade 10 to properly fit the vehicle door 90 and/or the vehicle window 92. Furthermore, the positioning tabs 40 continue to secure the window shade 10 to the vehicle door 90 and/or the vehicle window 92 during and/or after engagement of the hook 30 and the loop 38. Similarly, FIGS. 14A and 15A show the actions the users may take to engage the window shade 10 having a hook 30 and buttonhole 138 configuration.

Figure 18:
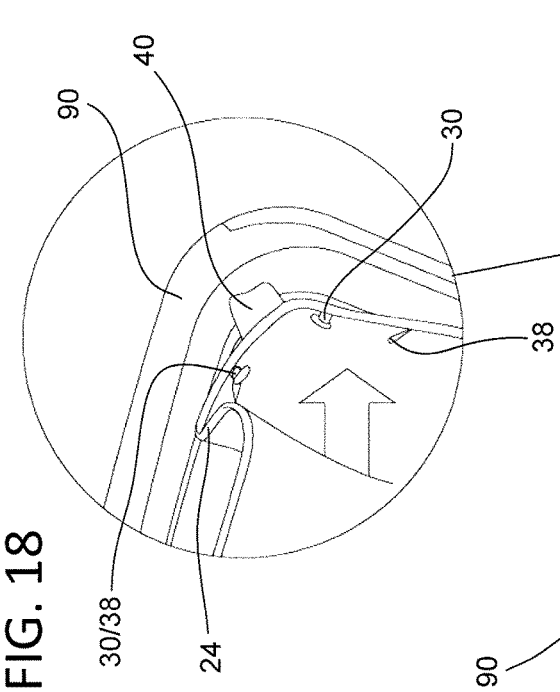
FIG. 18 shows a magnified example view of a second portion of FIG. 16.
Figure 17:
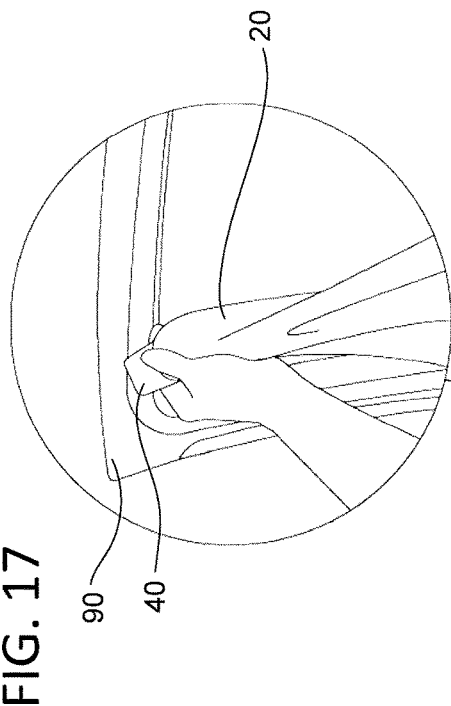
FIG. 17 shows a magnified example view of a first portion of FIG. 16.
Figure 16:
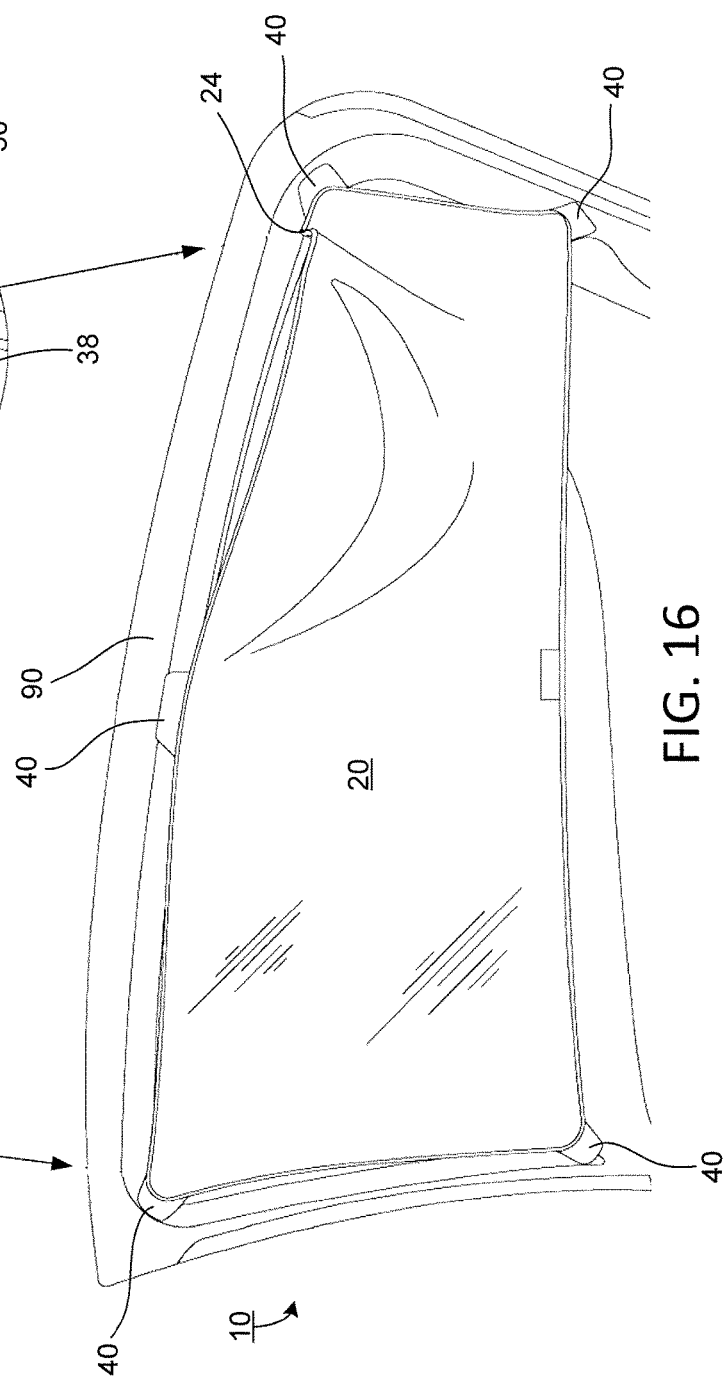
FIG. 16 shows the sixth step of installing the stretchable vehicle window shade.

FIG. 16-18 exemplify the window shade 10 securely fit to the vehicle door 90 and obscuring the vehicle window 92 (obscured). More specifically, the positioning tabs 40 are holding the window shade 10 in corners and other locations of the vehicle door 90. By making use of the elasticity of the frame 22 and the panel 20, the window shade 10 is capable of extending the entire length of the vehicle door 90. By utilizing the hook 30 and the loop 38 to create folds 24, the window shade 10 is capable of providing a more precise and/or accurate fit to the shape of the vehicle window 92 in both the length and width of the vehicle window 92.

It is to be understood that a temperature indicator (not shown) may be integrated into the stretchable window shade 10. The temperature indicator can be configured in a variety of ways, e.g., using thermochromatic material or ink configured to changed colors and/or opacity in response to temperature change. For example, the material or ink may turn from opaque to clear, or from one color to another (e.g., from blue to white), or vice versa in response to increases in temperature above one or more thresholds, or likewise in response to decreases in temperature below one or more thresholds. The temperature indicator may also be configured as liquid crystal polymers or thermocouples or thermistors and electronic displays. The temperature indicator may have a variety of appearances for providing visible indications of temperature. For example, possible appearances include incremental numbers, a single color such as the temperature indicator configured to change e.g., from white to red when the temperature exceeds a threshold, a bar graph such that may provide incremental or continuous temperature indicia, a thermometer bulb, or various other configurations.

Similarly, other attachments are within the scope of this application. Although not shown in the drawings, it is contemplated that the positioning tabs 40 are replaced with positioning retainers may be adapted to secure a lower end of the panel 20 to a lower portion of the vehicle window 92. In this configuration, the positioning retainers have a hook body to secure and hold the panel 20 within the lower portion of the vehicle window 92. In use, the hook body is positioned to be pushed by a handle into a gap in the lower portion of the vehicle window 92. The positioning retainer is then pushed down until the hook body is locked and/or secured into the window gap in order to secure the positioning retainer in place.

The illustrations and examples provided herein are for explanatory purposes and are not intended to limit the scope of the appended claims. It will be recognized by those skilled in the art that changes or modifications may be made to the above described embodiment without departing from the broad inventive concepts of the invention. It is understood therefore that the invention is not limited to the particular embodiment which is described, but is intended to cover all modifications and changes within the scope and spirit of the invention.

What is claimed:

1. A window shade comprising:
   a panel;
   a perimeter reducing mechanism attached to the panel, the perimeter reducing mechanism having at least one hook and at least one loop that is adapted to reduce a perimeter of the panel; and
   at least one positioning tab attached to the panel, the at least one positioning tab having a magnet disposed therein,
   wherein the magnet is adapted to attach to a metallic portion of a door frame.

2. The window shade recited in claim 1, wherein the at least one positioning tab is composed of at least two materials.

3. The window shade recited in claim 1, wherein the the at least one hook is adapted to receive the at least one loop to reduce a surface area of the panel.

4. The window shade recited in claim 1, wherein the panel is adapted to stretch to a larger surface area.

5. The window shade recited in claim 1, wherein the at least one positioning tab is adapted to provide shock absorption and a waterproof environment to the magnet.

6. The window shade recited in claim 1, wherein the panel is adapted to fit an entirety of a vehicle window.

7. A window shade comprising:
   a stretchable panel;
   at least one hook and at least one loop disposed around the panel, the at least one hook is adapted to receive the at least one loon to reduce a surface area of the panel; and
   at least one positioning tab attached to the panel, the at least one positioning tab having a magnet disposed therein,
   wherein the magnet is adapted to attach to a metallic portion of a door frame.

8. The window shade recited in claim 7, wherein the at least one positioning tab is composed of at least two materials.

9. The window shade recited in claim 7, further comprising a frame disposed around the stretchable panel.

10. The window shade recited in claim 7, wherein the at least one positioning tab is adapted to provide shock absorption and a waterproof environment to the magnet.

11. The window shade recited in claim 7, wherein a perimeter of the frame is adapted to fit substantially a perimeter of a vehicle window.

12. A window shade comprising:
    a panel having a frame, the frame having a perimeter;
    a perimeter reducing mechanism having at least one hook and at least one loop, the perimeter reducing mechanism adapted to reduce the perimeter of the frame; and
    at least one positioning tab attached to the panel or the frame, the at least one positioning tab having a magnet disposed therein,
    wherein the magnet is adapted to attach to a metallic portion of a door frame.

13. The window shade recited in claim 12, wherein the at least one positioning tab is composed of at least two materials.

14. The window shade recited in claim 12, wherein the at least one loop is a buttonhole disposed around the panel.

15. The window shade recited in claim 14, wherein the at least one hook is adapted to mate with the at least one buttonhole to reduce a surface area of the panel.

16. The window shade recited in claim 12, wherein the at least one positioning tab is adapted to provide shock absorption and a waterproof environment to the magnet.

17. The window shade recited in claim 12, wherein the perimeter of the frame is adapted to stretch to fit substantially a perimeter of a vehicle window.

* * * * *